Figure 1:
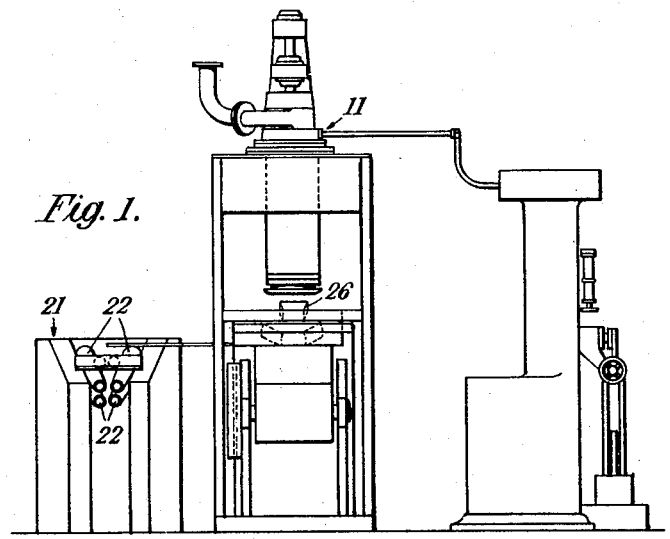

March 17, 1964  P. W. G. JOHNSTON  3,125,037
MANUFACTURE OF HARD CANDY

Filed Oct. 22, 1959  3 Sheets-Sheet 1

INVENTOR
Peter W. G. Johnston
By Watson, Cole, Grindle & Watson
ATTORNEYS

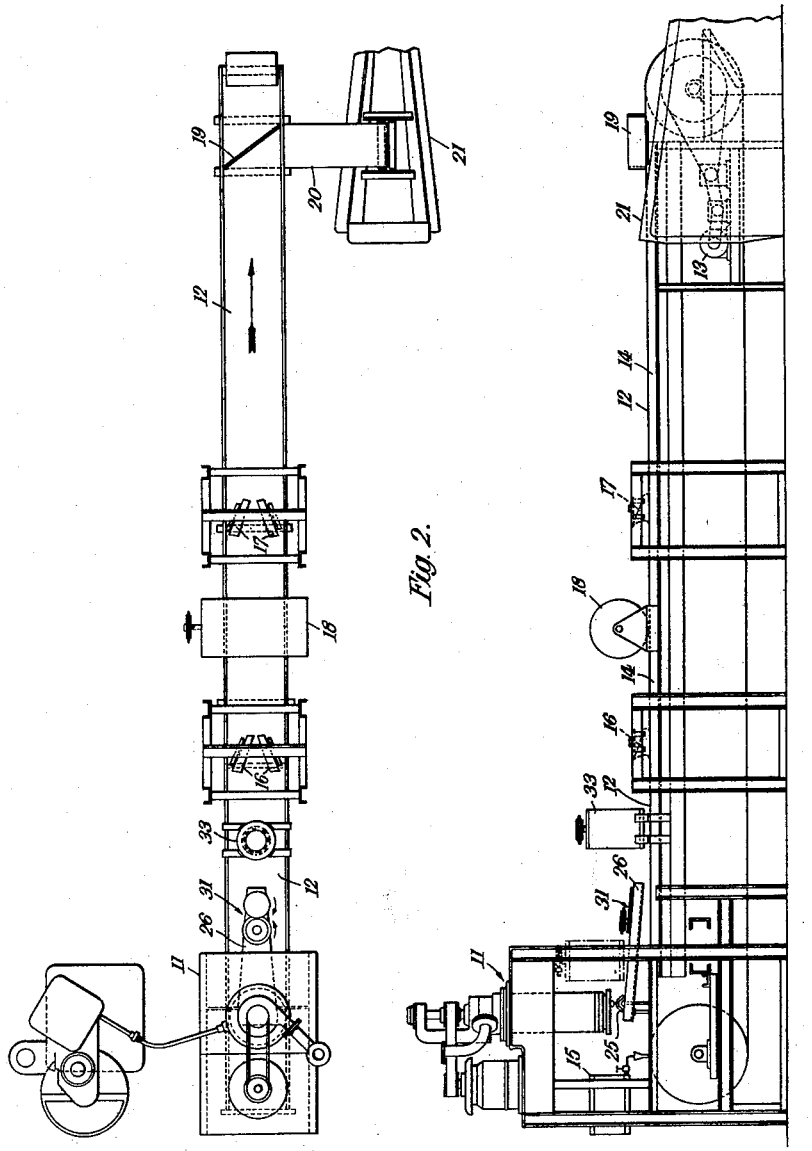

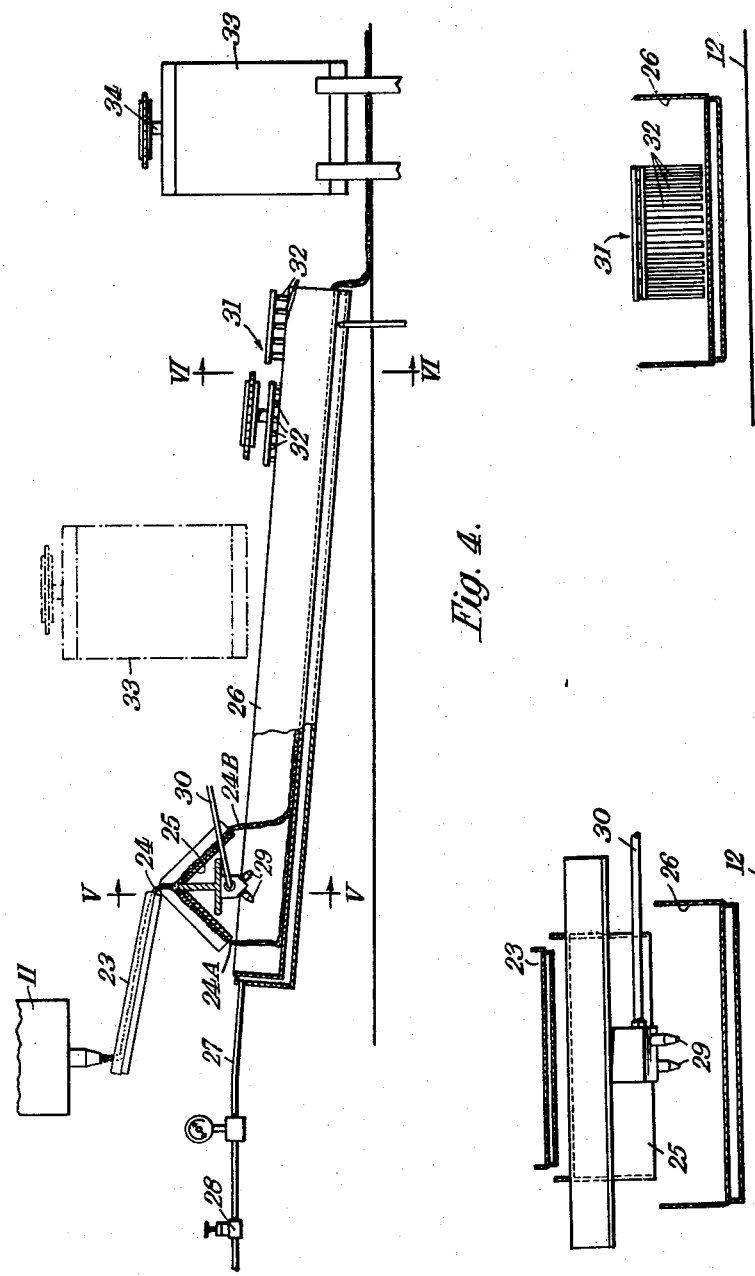

11,125,037
MANUFACTURE OF HARD CANDY

Peter W. G. Johnston, Jesmond, Newcastle-on-Tyne, England, assignor to Baker Perkins Holdings Limited, Peterborough, England, a company of Great Britain
Filed Oct. 22, 1959, Ser. No. 848,096
Claims priority, application Great Britain Oct. 29, 1958
6 Claims. (Cl. 107—1)

In the manufacture of high boiled sugar confectionery, the ingredients, normally granulated sugar, glucose and water are heated in a steam heated vessel to dissolve the sugar and are then transferred to a cooker and boiled to remove all or nearly all of the water. Various types of cookers are available, including open pan cookers, batch vacuum cookers, continuous vacuum cookers and Microfilm cookers. "Microfilm" is a registered trademark.

After the sugar has been cooked, it is customary to introduce into the sugar a flavouring, an acid, e.g. tartaric, citric or lactic acid, to enhance the flavour and frequently a colouring agent. The sugar is then introduced into a forming device, such for example as the former described in British Patent No. 784,157, which forms the sugar into a rope, a centre filling of jam, chocolate or the like being introduced, if desired, into the rope during formation thereof, and finally the rope of sugar is moulded by a moulding machine into confectionery tablets.

The additives (i.e. the flavouring, the acid and the colouring agent if required) have hitherto been introduced into the sugar by allowing a batch of cooked syrup to flow onto a table (at atmospheric temperature or slightly warmer) to form a layer perhaps ½" thick, scattering the additives on to the syrup and then folding the sugar over manually many times. This folding serves not only to disperse the additives uniformly throughout the mass of the sugar but also to prevent the skin of the sugar film from becoming preferentially chilled, the folds being made with the chilled surfaces of the sugar inside. After repeated folding, the sugar mass is in a condition suitable for transfer to the former.

The object of the invention is to eliminate manual folding of the sugar and to provide for continuous and automatic incorporation of additives in the sugar.

The invention accordingly provides a method of manufacturing high boiled sugar confectionery which includes the steps of continuously discharging cooked sugar from a cooker on to a cooled conveyor band, continuously supplying additives to the sugar prior to or after its arrival on the conveyor band and mechanically working the ribbon of sugar on the band to cool it and equalise its temperature. This mechanical working also serves to spread the additives evenly throughout the sugar mass.

The additives will normally include flavouring, which may contain a colouring agent, and acid. The flavouring, which is liquid, is conveniently added to the sugar by means of a spray nozzle to which the liquid flavouring is pumped continuously. It may, however, be squirted on to the sugar in closely consecutive puffs and the term "continuously" as used herein is to be understood as including this mode of application. When the acid is a solid acid it is conveniently supplied to the sugar in powdered form from a dispenser. In the case, however, of lactic acid the acid is conveniently sprayed on to the sugar through a spray nozzle.

The invention includes apparatus for the manufacture of high boiled sugar confectionery, comprising a cooker, a cooked conveyor band, means for continuously delivering a ribbon of cooked sugar from the cooker to the band, at least one plough for folding over the ribbon of sugar on the band and means for continuously supplying additives to the sugar prior to or after its arrival on the conveyor band.

The addition may be added to the sugar on the cooled band and immediately in advance of the plough. We prefer, however, to incorporate the flavouring in the sugar prior to its arrival on th band and under conditions such that volatile constituents of the flavouring are trapped by the sugar and prevented from escaping. Thus the sugar may be subdivided into two streams on its way to the band, and applied to the band in superposed laminations, the flavouring being introduced between the two streams of sugar before they are recombined.

Figure 8:
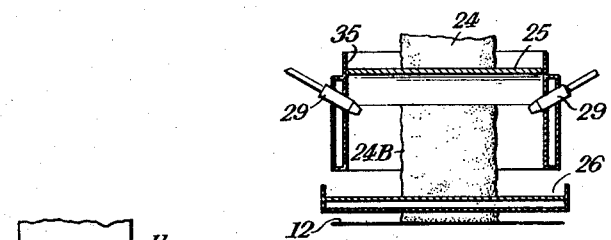
Figure 7:
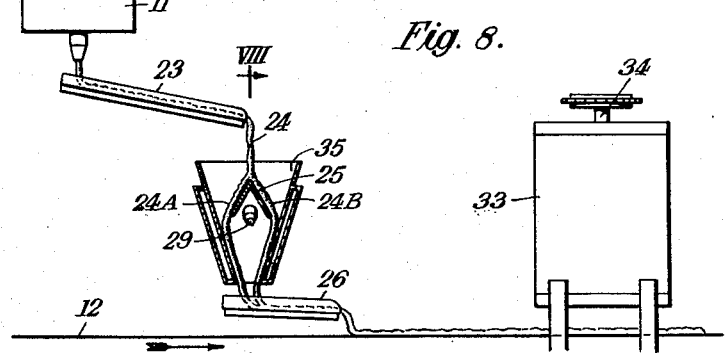

Certain embodiments of the invention will now be described in more detail, by way of example, with reference to the accompanying drawings in which:

FIG. 1 is an end elevation of an apparatus for the continuous production of high boiled sugar confectionery,
FIG. 2 is a corresponding plan view,
FIG. 3 is a corresponding side elevation,
FIG. 4 is a side elevation partly in section on a larger scale of the mechanism for discharging the sugar from the cooker to the cooled conveyor band,
FIGS. 5 and 6 are respectively sections on the lines V—V and VI—VI in FIG. 4,
FIG. 7 is a view similar to FIG. 4 showing an alternative arrangement for supplying the additives to the sugar and
FIG. 8 is a section on the line VIII—VIII in FIG. 7.

Like reference numerals indicate like parts throughout the figures.

As indicated in FIGS. 1–4, cooked sugar is delivered continuously from a Microfilm cooker 11 (which being of conventional construction will not be described in detail) to a steel conveyor band 12 driven by a motor 13. The upper run of the band 12 travels over a water jacket 14 to which cooling water is supplied from a tank 15. The ribbon of sugar on the band 12 is subjected to mechanical folding by consecutive pairs of ploughs 16, 17 which serve to cool and equalize the temperature of the sugar ribbon and prevent differential chilling of the sugar by continued contact of one surface of the ribbon with the cooled band 12. The ploughs also assist in improving the uniformity of distribution in the sugar of the additives which have previously been incorporated in the sugar as described later. Between the ploughs 16, 17 the thickness of the ribbon of sugar folded by the plough 16 is reduced by a sizing roll 18. The sugar is diverted from the band 12 by a plough 19 to a lateral conveyor 20 which feeds the sugar to a former 21 of the construction described in British Patent No. 784,157 and including four conical rolls 22 which form the sugar into a rope. The rope of sugar is fed to a machine (not shown) for forming it into tablets.

As best shown in FIG. 4 the sugar 24 is discharged from the cooker 11, preferably down a chute 23, to a deflector 25 of inverted V shape. For clarity the chute 23 is omitted from FIGS. 2 and 3. As a result the sugar is divided into two streams 24A, 24B which are deposited in superposed laminations on a further chute 26 which feeds the sugar to the band 12. The chute 26 is heated by steam supplied through a line 27 provided with a regulating valve 28. Liquid flavouring is squirted continuously into the space beneath the deflector 25 by spray nozzles 29 (FIG. 5) to which the flavouring is pumped through a pipe 30. The nozzles 29 may be constituted by thin hollow needles. The flavouring is thus incorporated between the two streams 24A, 24B of sugar. The flavoured sugar on the chute 26 is agitated by a pin mixer 31 constituted by a pair of rotary discs carrying pins 32 which project downwardly into the sugar. The pins 32 serve to agitate and mix the sugar.

Powdered acid is supplied continuously to the sugar from a dispenser 33 having a perforated bottom and containing a rotary brush (not shown) driven by a shaft 34 for agitating the powder. The dispenser 33 may be situated above the band 12, as shown in full lines in FIG. 4, or above the chute 26 in advance of the pin mixer 31 as shown in chain dotted lines.

In the construction shown in FIGS. 7 and 8, the stream of sugar from the chute 23 is again divided into two streams 24A, 24B by a deflector 25 of inverted V shape located within the funnel 35. The flavouring is squirted through nozzles 29 into the zone beneath the deflector 25 which is effectively sealed against escape of volatile constituents of the flavouring. The mixture emerging from the bottom of the funnel 35 is fed by a steam jacketed chute 26 on to the cooled band 12.

What I claim as my invention and desire to secure by Letters Patent is:

1. Apparatus for the manufacture of high boiled sugar confectionery, comprising a continuous cooker, a cooled conveyor band, a chute for delivering a continuous flow of sugar from the cooker, a deflector plate positioned beneath the discharge end of the band and effective to split the sugar discharged by the chute into two streams which flow downwardly from the deflector plate and are delivered in superposition to the band to form a single ribbon thereon, a nozzle situated beneath the deflector plate and between said descending streams of sugar, means for supplying volatile liquid flavouring to said nozzle and thereby continuously introducing said flavouring between said streams of sugar so that said flavouring will be trapped between said streams upon their reunion and at least one plough for folding over said ribbon of sugar as it travels on the band.

2. Apparatus according to claim 1, which includes a further chute beneath said deflector plate for receiving and reuniting the streams of sugar flowing from the deflector plate and delivering said reunited streams of sugar to the band.

3. Apparatus according to claim 2, which includes a funnel situated above said further chute and surrounding said deflector plate.

4. Apparatus according to claim 2, which includes a pin mixer for agitating the sugar on the further chute.

5. Apparatus according to claim 1, which includes a pin mixer for agitating the sugar on the band prior to its arrival at the plough.

6. Apparatus according to claim 1, which includes a dispenser for continuously discharging powdered acid on to the sugar prior to its arrival at the plough.

References Cited in the file of this patent

UNITED STATES PATENTS

| | | |
|---|---|---|
| 1,915,528 | Haug | June 27, 1933 |
| 2,017,605 | Peters | Oct. 15, 1935 |
| 2,195,346 | Verheij | Mar. 26, 1940 |
| 2,217,896 | Fonken | Oct. 15, 1940 |
| 2,256,190 | Bowman | Sept. 16, 1941 |
| 2,261,043 | Winfree | Oct. 28, 1941 |
| 2,577,925 | Sternbach | Dec. 11, 1951 |
| 2,648,297 | Cloud | Aug. 11, 1953 |
| 2,747,521 | Gardner | May 29, 1956 |

FOREIGN PATENTS

| | | |
|---|---|---|
| 662,975 | Great Britain | Dec. 12, 1951 |